United States Patent Office.

HENRY M. PAINE, OF WORCESTER, MASSACHUSETTS.

IMPROVEMENT IN BENZOLE-LIGHTS.

Specification forming part of Letters Patent No. 9,119, dated July 13, 1852.

*To all whom it may concern:*

Be it known that I, HENRY M. PAINE, of the city and county of Worcester and State of Massachusetts, have invented a new and useful combination of materials and processes by which the vapor of benzole and alcohol diffused through atmospheric air may be rendered luminiferous and fitted for burning like gas for purposes of light, as well as for any other purpose for which it may be made applicable, of which the following is a specification.

To enable others to make and use my invention, I will proceed to give a full description of the same.

The applications of atmospheric air to the combustion of the volatile hydrocarbons have been numerous within the past ten years. Among these, and somewhat connected with the one I shall describe, are the inventions of C. P. Mansfield, in England, noticed in Vol. 49, London Mechanics' Magazine. In his pamphlet on the economical uses of the hydrocarbons, and in various memoirs contained in journals, one common principle of action has hitherto been applied in rendering these vapors by the agency of the air capable of burning and affording light. It is that of vaporizing the more volatile hydrocarbons by the application of heat sustained by artificial means. As the heat of the hydrocarbon vapor thus raised must be derived from the portion subjected to evaporation, if extraneous heat be not applied the temperature falls, and the light-giving power is diminished or altogether ceases.

In making use of the various hydrocarbons— such as coal naphtha, benzole, or equivalents, mixed with different alcoholic liquids—I have discovered that when alcohol and benzole are mixed with a certain amount of water the temperature of the mixture in the burning thereof is longer sustained than when benzole alone, or benzole and alcohol are used by themselves. I have also further ascertained that when water makes a part of the mixture the flame, though somewhat more yellow, has a better body than when benzole or a mixture of alcohol and benzole are used. These facts led me to experiment in various ways with the use of water by passing common air through a vessel containing it, also as an ingredient of the compound, thus forming an atmosphere of moisture. One of the most obvious methods of burning the compound consisted in mixing one measure of benzole, two measures of alcohol, and about one measure of water, or enough water to render a milky appearance to the mixture, and thus diffuse the water among the particles of alcohol and benzole, and then forcing atmospheric air through the vessel holding this mixture, and thence through pipes to a burner, where the jet is lighted in the usual manner, and continues to burn as a gas.

Another mode of using my compound consists in making the mixture substantially as stated, agitating it so as to diffuse the particles generally among each other, and pouring it into a vessel containing sponges or cotton-bats, or both, or hair or wool, or other porous substances or equivalents. Such materials are saturated with the mixture and packed in any vessel capable of holding them, and a current of air is forced into said vessel and out through pipes leading to the burners. I have also learned in repeating experiments that when the mixture has been once made in the manner set forth, and either of the materials exhausted so as to require renewal, it is not necessary to repeat the alcohol or alcohol and water each time; but such renewal may be made by merely adding more benzole and using the same remains of alcohol or alcohol and water in the vessel of mixture—some ten or more renewals of benzole, and with occasional renewals of water or alcohol and water less frequent than that of benzole.

I do not lay claim to any particular apparatus; but

What I do claim as my invention or discovery is—

The mixture of alcohol, benzole, and such proportions of water as shall render the mixture milky in appearance, and passing air through the same, substantially as herein set forth.

I do not confine myself to the exact proportion of water named in the specification, but design to cover the results herein named.

HENRY M. PAINE.

Witnesses:
   J. BIGELOW,
   D. SAUNDERS.